United States Patent [19]

Bucher

[11] E Re. 30,686

[45] Reissued Jul. 21, 1981

[54] REMOTE STARTING SYSTEM FOR A COMBUSTION ENGINE

[76] Inventor: Jeffry C. Bucher, R.D. No. 1, Aspers, Pa. 17304

[21] Appl. No.: 967,719

[22] Filed: Dec. 8, 1978

Related U.S. Patent Documents

Reissue of:

[64] Patent No.: 4,080,537
Issued: Mar. 21, 1978
Appl. No.: 643,664
Filed: Dec. 23, 1975

[51] Int. Cl.[2] ..... H02P 9/04

[52] U.S. Cl. ..... 290/38 R; 290/37 R; 290/37 A; 290/38 C; 123/179 B

[58] Field of Search ..... 290/37 R, 37 A, 38 R, 290/38 A, 38 B, 38 C, 38 D, 38 E, DIG. 1, DIG. 3; 123/179 B

[56] References Cited

U.S. PATENT DOCUMENTS

| | | | |
|---|---|---|---|
| 3,543,302 | 11/1970 | Wolthausen | 123/179 B |
| 3,731,108 | 5/1973 | Kobara et al. | 290/37 |
| 3,793,529 | 2/1974 | Bucher | 290/37 |
| 3,859,540 | 1/1975 | Weiner | 290/38 |

*Primary Examiner*—B. Dobeck
*Attorney, Agent, or Firm*—H. J. Birch

[57] ABSTRACT

A system is disclosed for enabling a user to start an engine from a remote location, utilizing a receiver for receiving a command signal from a remote transmitter operated by the user, the receiver generating signals to control operation of the starting system. The system enables the user, from the remote location, to effect selective momentary pumping of fuel into the engine prior to activation of the starting operation, and then to start the engine. The system may include apparatus for maintaining the throttle of the engine substantially open until the engine is started and then closing the throttle to an idling position, with automatic momentary pumping of additional fuel into the engine at predetermined intervals during the running of the engine in accordance with the starting operation. Protective apparatus may be included with the system to prevent activation of the starting operation at any time a manually controlled starting switch has been activated prior to activation of the starting system. Additional protective devices may be included to prevent improper activation of the momentary fuel feed apparatus by the user after the engine has been started, and to stop the engine upon the occurrence of any of several predetermined events, including excessively prolonged activation of the starter motor without starting of the engine, opening the door or applying the brake of the vehicle in which the system and engine may be installed, or the idling of the engine for a predetermined period of time under control of a starting system.

11 Claims, 2 Drawing Figures

REMOTE STARTING SYSTEM FOR A COMBUSTION ENGINE

Matter enclosed in heavy brackets [ ] appears in the original patent but forms no part of this reissue specification; matter printed in italics indicates the additions made by reissue.

BACKGROUND OF THE INVENTION

The present invention is an improvement of the remote starting system disclosed in U.S. Pat. Nos. 3,478,730 and 3,793,529. The systems disclosed in those previous patents were substantial improvements over the known devices for starting an engine from a remote location, and the system disclosed herein incorporates certain desirable additional features and improvements. The aforesaid patents set forth the background of the invention in detail, including citations of prior art of interest. Subsequently issued U.S. Pat. No. 3,685,606 also is of interest, but does not disclose or suggest the novel features and attendant advantages of the system disclosed herein.

SUMMARY OF THE INVENTION

The system of the invention enables a user to start, from a remote location, an engine having an electric starter motor and a source of electrical potential associated therewith, such as, an automobile or truck engine. The starting system utilizes a receiver for receiving a coded control signal from the user at a remote location. The system further comprises an energizing circuit coupled to the control signal receiver and including means for activating a programmed starting operation in response to such a control signal and connecting the potential source to a starter motor. Apparatus is provided for selective, user-controlled momentary pumping, from such remote location, of fuel into the engine prior to activation of the starting operation.

The system may further include sequencing apparatus for activating the starting operation after such user-controlled momentary pumping of the fuel has stopped for a predetermined period of time, and protective apparatus for preventing any undesired momentary pumping of fuel by the system, and additional protective apparatus may be incorporated to prevent activation of the starting operation by spurious signals.

DESCRIPTION OF A PREFERRED EMBODIMENT

Figure 1A:
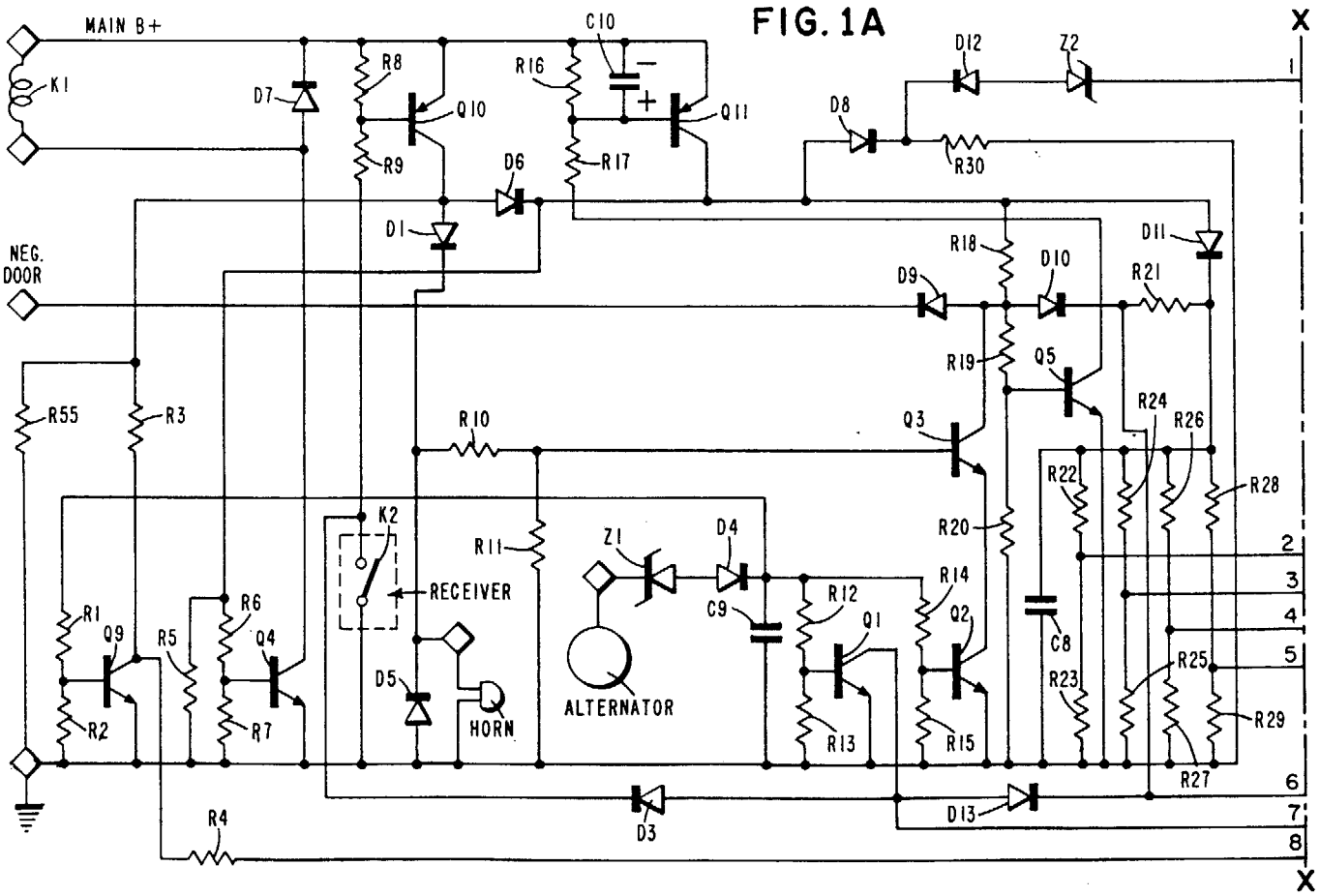
FIGS. 1 and 1A are schematic diagrams of a preferred embodiment of the remote starting system of this invention.

The remote starting system of this invention, one embodiment of which is illustrated in the schematic diagram of FIG. 1, includes a plurality of interconnected timing and protective devices which provide control signals for starting an engine in response to a remotely transmitted control signal. The system provides for selective user-controlled momentary pumping of fuel into the engine, such as for priming, prior to starting and for automatic momentary pumping of fuel at predetermined intervals during the starting operation, with protective devices preventing unintended momentary pumping of fuel. Other apparatus provides for stopping the engine upon a subsequent command from the remote signal transmitter or upon the occurrence of any one of a number of malfunctions or other predetermined events. The system is described with respect to a conventionally carbureted, spark ignition internal combustion engine; however, it is equally applicable to fuel injected engines, diesel engines and other types of combustion engines.

In the preferred embodiment of this system a signal receiver is mounted in a vehicle to receive a coded control signal from a signal transmitter carried by a user. The receiver and transmitter may desirably be radio units of the type disclosed in the aforementioned U.S. Pat. No. 3,478,730, or may be of other types, either radio-linked, wire-connected, or of any other suitable type. The system control signal from the receiver initially effects the momentary pumping of fuel into the engine and the connecting of a source of electrical potential to the ignition system, and then, after a predetermined delay, activates the actual starting operation, connecting the electrical potential source to the starter motor. The system includes novel protective means for preventing improper activation by spurious signals and externally generated electrical noise.

Figure 1B:
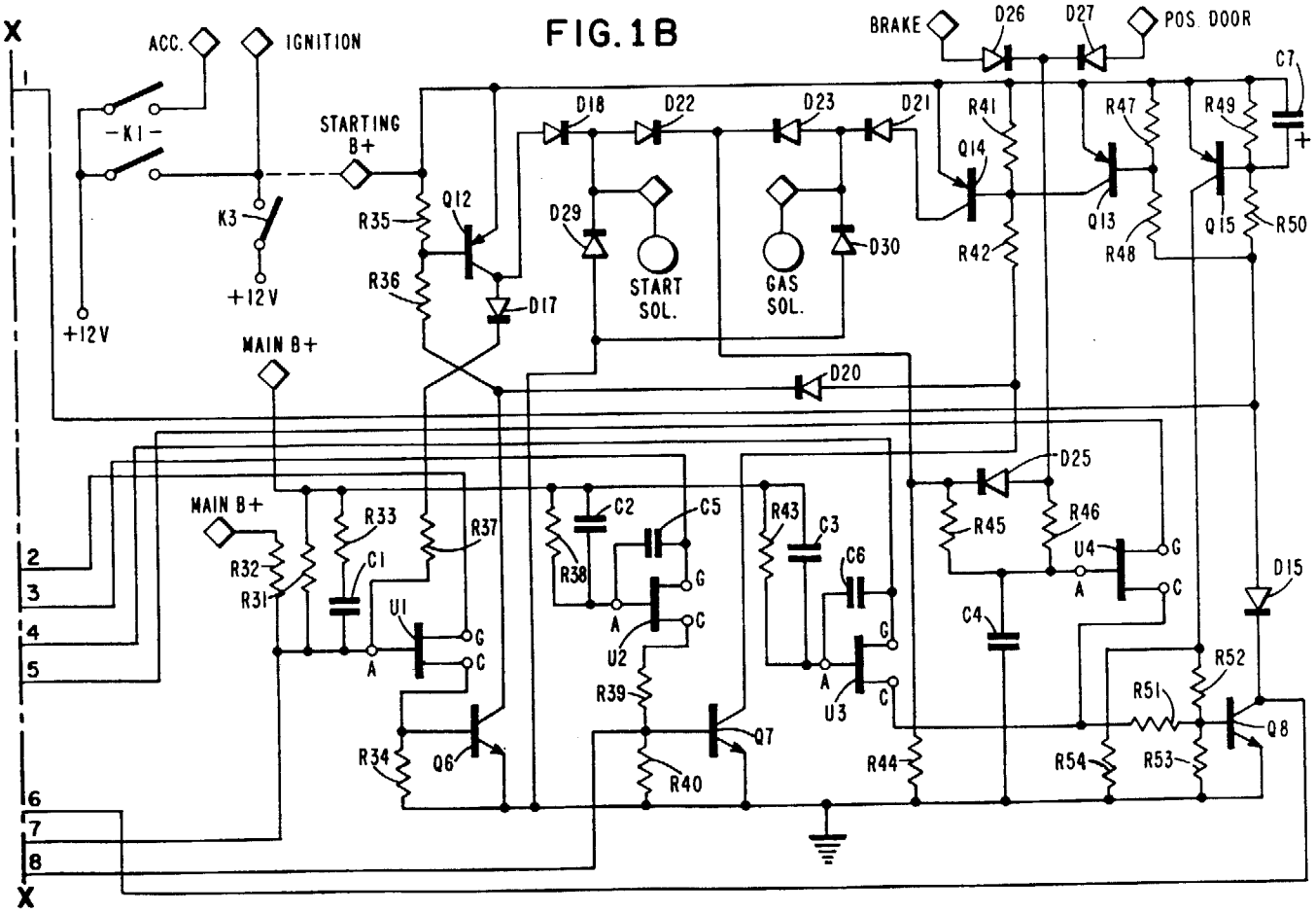

The main power supply line for the system, designated MAIN B+, is connected at all relevant times after installation of the system, for example, in an automobile, to a potential source such as a conventional automobile battery. The diamond-shaped symbols on the schematic represent plug connections. The numbers 1–8 immediately adjacent broken line X—X on FIG. 1B represent continuations of the connections denoted by numbers 1–8 immediately adjacent broken line X—X on FIG. 1A. The signal receiver, referenced above, is not shown in its entirety on the schematic since its only function is to provide control signals to the system. This control function is effected by utilizing the signal received by its receiver to close a relay K2, illustrated in the schematic, at any time a control signal is sent to the receiver, and to maintain that relay closed for the duration of the signal. Such signals are sent by the user activating a momentary command switch on the transmitter, the duration of the signal corresponding to the duration of activation of such switch by the user. K2 is a relay activated by the radio, one side being connected to ground and the other connected to R9. R9, in turn, is connected to the base of PNP transistor Q10 and to MAIN B+ source through resistor R8. When relay K2 is closed, by a control signal from the receiver, a ground path is established from MAIN B+ to resistors R8 and R9, thus biasing and turning on transistor Q10 and applying MAIN B+ current to the anodes of diodes D6 and D1 for the duration of the control signal.

If desired, the cathode of diode D1 may be connected to apply potential to a warning device such as the automobile horn, thus providing for a brief blast to signal energization of the starting system. The energization of diode D6 also provides biasing current to the base of NPN transistor Q5, which is connected between the cathode of diode D6 and ground. This application of bias current turns on transistor Q5, thus establishing a ground path through its emitter-collector circuit and through resistor R17 to the base of PNP transistor Q11, which in turn is connected to the potential of the MAIN B+ line. Thus, biasing potential is also applied to the transistor Q11, turning it on and establishing an additional biasing path between the MAIN B+ line and the base of transistor Q5. This arrangement provides a latching circuit to keep transistors Q11 and Q5 turned on until affirmatively switched off by a subsequent predetermined event.

To prevent inadvertent activation of this starting operation by externally generated electrical transients and spikes, capacitor C10 is installed between MAIN B+ and the base of transistor Q11. The noise suppression effect of this capacitor has been found most effective when the capacitor is installed with its polarity reversed, that is, with its normally negative contact connected to the positive MAIN B+ line and its normally positive contact connected to the base of transistor Q11. Surprisingly, and for reasons not fully understood, this reversed-polarity installation of capacitor C10, with suppression resistor R16 connected across the capacitor, has been found to be highly effective in preventing activation of the system by spurious signals and externally generated noise present in the potential used with this system. Installation of capacitor C10 with a conventional polarity configuration has been found to be substantially less satisfactory.

The value of capacitor C10 is selected so that under normal operating conditions, the voltage across the capacitor never exceeds its breakdown potential. In a system for a typical automobile engine, employing a 12 volt battery potential source, the voltage across capacitor C10 normally is 0.4 volt and does not exceed 0.7 volt, unless other components of the system fail first. For such a system, capacitor C10 is selected to have a breakdown potential of at least 2 volts.

Upon the application of the MAIN B+ potential to diode D6, and the latching, within a few nanoseconds, of transistors Q5 and Q11, the B+ potential is applied to diode D8, thus providing MAIN B+ potential at the cathode of diode D12 and preventing a grounding path from diode D12 through resistor R30, for a purpose that will become more apparent subsequently.

Connected between ground and the cathode of diode D6 and collector of transistor Q11 is the base NPN transistor Q4. Thus, application of MAIN B+ potential to diode D6, or through the emitter-collector circuit of transistor Q11, provides a biasing potential to the base of transistor Q4, thus turning on transistor Q4 and establishing a grounding path through its emitter-collector circuit for the low side of the coil of relay K1. The energization of the coil of relay K1 then pulls in the relay, closing its contacts within a few milliseconds of the energization of transistor Q4. The dual sources of MAIN B+ potential available to transistor Q4, either from the cathode of diode D6 or from the collector of transistor Q11, maintain the bias, and thus activation, of transistor Q4 and keep closed the contacts of relay K1 as long as either or both of transistors Q10 and Q11 are activated. The closing of the contacts of relay K1 then applies electrical potential, suitably +12 volts from the automobile battery, both to the STARTING B+ line and to the ignition system (IGNITION) and to any desired accessories (ACC) associated with the engine, for example, the headlights or heater of an automobile. These accessories will thus remain activated as long as the system maintains the contacts of relay K1 closed.

At this point, the system is fully energized, with both MAIN B+ and STARTING B+ potential applied. However, the initiation of the actual starting operation of the engine is delayed for a brief period after the initial energization, in a manner and for reasons to be described below. For purposes of this invention, the term "starting operation" includes both the actual cranking and starting of the engine and the running of the engine for a predetermined period of time under the control of the starting system.

The activation of the latching circuit containing transistors Q11 and Q5 also provides potential to diode D11, connected between the collector of transistor Q11 and a voltage dividing network comprising voltage stabilizing capacitor C8 and resistors R22, R23, R24, R25, R26, R27, R28 and R29. This now-energized voltage dividing network provides reference voltages to the gates G of unijunction transistor timing devices U1, U2, U3 and U4.

Programmable unijunction transistor timing device U1 provides for the desired brief delay between the initial energization of the starting system and the initiation of the actual starting operation. Since the anode A of unijunction U1 is connected at all times to MAIN B+ through an R-C delay circuit comprising resistors R31, R32, R33 and capacitor C1, the charging of capacitor C1 and its associated timing is initiated at the instant the reference voltage is applied to the gate G of the unijunction from voltage dividing network R22–R23. The values of resistors R31, R32 and R33 and capacitor C1 are selected to provide the desired delay, suitably five seconds. It may be noted, however, that the anode of unijunction U1 is also connected, through diode D3 to the high side of receiver relay K2. Thus, whenever the contacts of relay K2 are closed, providing a path to ground in response to a receiver control signal, the anode A of delay timer U1 is grounded, thus preventing the initiation of the five second timing delay on U1 and preventing U1 from completing its timing out and activating, if it has begun. Accordingly, repeated keying of the transmitter by the user at intervals of less than five seconds will prevent the initiation of the starting operation, even after the circuit has been energized.

By the provision of this repeatably resettable five second delay by U1, the system facilitates repeated momentary pumping of fuel into the engine, such as for pre-start priming, by the user from the remote location in the following manner. As previously described, upon keying the transmitter and sending a control signal to the receiver and thus closing the contacts of relay K2, transistor Q10 is turned on, thus providing MAIN B+ potential at its collector. Resistors R3 and R4 are connected in series to the collector of transistor Q10 and to the base of NPN transistor Q7, thus providing biasing potential and turning on transistor Q7. Resistor R5 (and resistors R54 and R55) is provided for additional noise suppression. The activation of transistor Q7 then establishes a grounding path across its emitter-collector circuit to resistor R42 and thence to the base of transistor Q14. The connection of the base of transistor Q14 to STARTING B+ through resistor R41 thus provides biasing potential to turn on transistor Q14, thereby establishing a path across its emitter-collector circuit from STARTING B+ through diode D21 to GAS SOL. GAS SOL is a device such as a solenoid connected to the throttle linkage of the engine. In a conventionally carbureted engine this solenoid, GAS SOL, is connected to the carburetor accelerator pump and to the carburetor butterfly valve such that activation of GAS SOL provides for a momentary pumping of fuel by the accelerator pump and also holds the carburetor butterfly valve open for the duration of such activation. Thus, upon the closing of the contacts of relay K2 by a signal from the user, GAS SOL may be activated, effecting a momentary pumping of fuel into the engine. As described above, if this signal and its resulting activation of GAS SOL is repeated at intervals of less than five seconds, this user-controlled momentary pumping of fuel into the engine may be repeated as long as desired prior to the initiation of the starting operation. Similarly, termination of this activation of GAS SOL by the user for a period of more than five seconds will permit unijunction U1 to time out and begin the system starting operation.

When unijunction U1 has so timed out, the potential from MAIN B+ through the aforementioned R-C circuit will then be provided at the cathode C of unijunction U1, to which the base of NPN transistor Q6 is connected. Thus, a biasing potential is provided to transistor Q6, turning it on and providing a grounding path both for resistor R36 connected to the base of PNP transistor Q12, and for diode D20 and resistor R42 connected to the base of PNP transistor Q14, all of this occurring immediately after the five second delay effected by unijunction timer U1. Since the base of transistor Q12 is connected to STARTING B+ potential through resistor R35 and to ground through resistor R36 and transistor Q6, Q12 thus will also be turned on. The connection of the emitter of transistor Q12 to STARTING B+ potential and the collector of Q12 to diode D17 and resistor R37 and thence to the anode of unijunction U1 thereby provides an additional source of potential into unijunction U1. Thus, a latching circuit is effected which keeps transistors Q6 and Q12 and unijunction U1 turned on until deactivated by a subsequent predetermined event. Resistor R41 is connected between STARTING B+ potential and the base of PNP transistor Q14. Since the activation of transistor Q6 provides a grounding path between the base of Q14 through resistor R42 and diode D20, the activation of transistor Q6 also turns on transistor Q14. As previously described with respect to transistor Q7, the activation of transistor Q14 also activates GAS SOL. As previously described, the activation of GAS SOL provides a momentary pumping of fuel into the engine and also holds the throttle or butterfly valve of the carburetor open as long as transistor Q14 remains activated.

At the same time that the fuel feed device GAS SOL is being activated by transistors Q6 and Q14, the activation of transistor Q12 provides a positive potential from its collector through diode D18 to the starter solenoid, denoted as START SOL, thereby applying potential to the starter motor and beginning the cranking of the engine. Diode D29, and corresponding diode D30, are suppression diodes between START SOL and ground and between GAS SOL and ground, respectively. Thus, by the arrangement of the START SOL and GAS SOL circuitry, it can be seen that, five seconds after the starting system (and ignition system) is energized, there will be momentary pumping of gas into the engine with the throttle held substantially open, and then electrical potential will be provided to the starter motor for cranking the engine. Under normal circumstances this will quickly result in the starting of the engine.

Once the engine has started it is desirable both to de-energize the starter motor by de-energizing START SOL and also to close the throttle back to an idle position, by de-energizing GAS SOL. This function may suitably be performed by detecting the output of the alternator (or generator) associated with the engine. Once the engine has started and accelerated, the alternator will begin its generation of current. As seen in the diagram, zener diode D1 and diode D4 are connected in series between the alternator and the bases of NPN transistors Q1 and Q2. Thus, when the engine has accelerated to a speed at which the alternator has reached a predetermined electrical output, conveniently about 7.2 volts, zener Z1 will break down and conduct, thus turning on transistors Q1 and Q2. The emitter of Q1 is connected to ground and the collector thereof to the anode of programmable unijunction timer U1. Accordingly, when transistor Q1 is turned on by the alternator, the anode of timer U1 is grounded, thus causing U1 to drop out, and, accordingly, turning off transistor Q6. The deactivation of transistor Q6 then breaks the ground path from resistor R36 and from diode D20 and resistor R42, thus removing the bias from and turning off transistors Q12 and Q14. As a result, both START SOL and GAS SOL are de-energized, thereby de-energizing the starter motor and permitting the throttle to close back to an idling position before the engine overspeeds and causes any damage to itself or to the starter motor.

If the engine starts, but then stalls and dies, the output from the alternator will terminate, thus removing the potential from the cathode of diode D4. This condition then removes the biasing potential from transistors Q1 and Q2, turning off those transistors and interrupting their emitter-collector circuits to ground. Thus, the anode of unijunction timer U1 is no longer grounded, and U1 is permitted to begin its timing-out sequence once again, with the system-controlled activation of START SOL and GAS SOL occurring once again. If the engine then starts and then dies again, this system will repeat this procedure and attempt another restart. Once the engine has started properly and is running under system control, the apparatus and its procedure described in the preceding paragraph will once again ground the anode of U1 and deactivate START SOL and GAS SOL, all as previously described.

At this point, in normal operations, the engine will be running, preferably at a fast idle to speed its warm-up. Accordingly, after a period of time, it is desired to reduce the speed of idle, such as is commonly done by a driver tapping the accelerator pedal of an automobile. This function is achieved by periodic momentary activation of GAS SOL at a plurality of predetermined intervals during the starting operations. It has been found that activation of GAS SOL at approximately four minute intervals over an approximate twelve minute starting operation is desirable. Thus, an R-C circuit comprising resistor R38 and capacitor C2 is connected between the MAIN B+ line and the anode A of programmable momentary unijunction timer U2, with parameters chosen to provide for approximtely four minute, periodic, momentary activation of timer U2. Capacitor C5 connected between the anode and gate of timer U2 represents a portion of the programming apparatus. Thus, approximately four minutes after the starting system is energized and an appropriate reference voltage is applied to the gate G of unijunction U2, it times out and provides a potential at its cathode C and thus to the base of NPN transistor Q7. The timing out of unijunction U2 thus momentarily activates transistor Q7 at four minutes intervals. Since resistor R42, connected to the base of transistor Q14, is also connected to the collector of transistor Q7, the activation of transistor Q7 provides a biasing path for electrical potential to the base of Q14, independent of the above-described activation and deactivation of transistor Q6. Thus, when timer U2 is momentarily activated, GAS SOL is likewise momentarily activated, providing a momentary pumping of fuel into the engine in a manner similar to a driver tapping the accelerator pedal of an automobile. Upon activation and deactivation of U2, caused by the discharge of previously charged capacitor C2, it can be seen that the four minute charging of capacitor C2 will begin again, thus providing for another momentary activation of GAS SOL approximately four minutes later. This operation will be repeated at the predetermined intervals as long as the circuit is activated, thus facilitating the transition of the engine from its initial fast idle to its standard idling speed. It may be noted that the values of resistor R38 and capacitor C2 are selected to provide for the desired activation period of timer U2. The structure of timer U2 provides for the desired length of activation of GAS SOL upon each timing out of timer U2.

With the engine started and idling properly it is desirable that the engine be allowed to run only for a predetermined time, such as twelve minutes, to provide for thorough warm-up but avoiding unnecessarily prolonged idling. Accordingly, a circuit is provided to enable this starting operation to shut down the starting system and turn off the engine after it has started and run in accordance with the starting operation for such predetermined period. This timing circuit is associated with programmable unijunction transistor timer U3. In a manner similar to that described with respect to timer U2, an R-C circuit comprising resistor R43 and capacitor C3 is connected between the MAIN B+ line and the anode of unijunction U3. The values of resistors R43 and C3 are selected to provide the desired running period of the engine, such as twelve minutes, before timing out and activating timer U3. Capacitor C6, connected between the anode and the gate of unijunction U3, represents an additional portion of the time delay programming of the timing unijunction U3. When the predetermined period of time has elapsed and capacitor C3 discharges, unijunction U3 times out, providing a potential at the cathode of U3, which is connected through R51 to the base of NPN transistor Q8, the base also being connected to ground through resistor R53. This potential turns on transistor Q8, establishing a circuit from the collector through the emitter to ground. The collector of Q8 is connected to the cathode of diode D10, which is connected into the previously described Q11–Q5 latching circuit between resistors R18 and R19 and ahead of the base of transistor Q5. Accordingly, when transistor Q8 is turned on, the cathode of diode D10 will be grounded, thus shorting the potential away from the base of Q5, turning off transistor Q5 and thus breaking the circuit to ground between the cathode of transistor Q5, resistor R17 and the base of transistor Q11. Accordingly, transistor Q11 is likewise turned off, breaking its emitter-collector circuit between MAIN B+ line, through resistor R6 to the base of transistor Q4. Consequently, transistor Q4 is also turned off, de-energizing the coil and opening the contacts of relay K1 and breaking the circuit between the battery and the ignition system (IGNITION) of the engine as well as from the STARTING B+ line. Accordingly, with the ignition circuit open, the engine is shut down. If the apparatus were utilized in a diesel engine, the IGNITION connection may suitably be replaced with a connection controlling the operation or disabling of the fuel injection, or other component, similarly providing for shutdown.

The starting system also provides for shutting down the engine in response to a control signal sent by the user to the receiver. This shutdown operation is performed in a manner analogous to that previously described. With the engine running, the output of the alternator maintains transistor Q2 in an activated condition, with a circuit established from the collector through the emitter to ground. The collector of Q2 is connected to the emitter of NPN transistor Q3, with the collector of Q3 connected between resistors R18 and R19. The base of transistor Q3 is connected to ground through resistor R11 and to the cathode of diode D1 through resistor R10. As described above, when a control signal is sent to the receiver, the contacts of normally open relay K2 are closed and held closed for the duration of the signal. The closing of the contacts of relay K2 provides bias to the base of transistor Q10, thus providing potential from MAIN B+ to the anodes of diodes D1 and D6. This potential is then applied through resistor R10 to the base of transistor Q3, turning on transistor Q3 and thus grounding resistor R18 through transistor Q2. As previously described with respect to the activation of transistor Q8, the grounding of resistor R18 turns off transistors Q5 and Q11, thus removing the circuit through Q11 as a source of potential for activating transistor Q4, which maintains the contacts of relay K1 closed. However, it may be seen that as long as the contacts of relay K2 are held closed by the control signal from the receiver, thus keeping transistor Q10 turned on, a secondary source of potential exists from MAIN B+ through diode D6 to the base of transistor Q4. Accordingly, as long as the user keys the transmitter, thus activating the receiver and holding the contacts of relay K2 closed, the contacts of relay K1 will remain closed, maintaining +12 volt power to IGNITION and allowing the engine to continue running. However, upon release of the transmitter key, the control signal holding the contacts of relay K2 closed will be removed, breaking that circuit and turning off transistor Q10, thus removing all sources of biasing potential from transistor Q4 and causing relay K1 to open, thus de-energizing the ignition system and stopping the engine. Accordingly, it can be seen that sending a control signal to the starting system while the system is in operation and the engine is running will provide for a user-controlled shutdown of the engine and de-energization of the starting system.

When the engine has shut down, it is desirable to bleed off all reference voltages from the unijunction programmable timers in order to reset all such timers prior to subsequent activation of the system, so that a subsequent starting operation may proceed in its desired order. As noted above, the network for providing the reference voltages to the programmable unijunction timers includes voltage dividers R22–R23, R24–R25, R26–R27 and R28–R29, with capacitor C8 connected in parallel with each of those voltage dividers. This capacitor C8, which is connected through diode D11 and transistor Q11 to the MAIN B+ potential, is included to maintain a constant voltage across the voltage dividing network despite transients in the system, such as caused by the activation of the starter motor or other accessories. The capacitor C8 provides the reference voltage network wiitth a relatively constant voltage for a period of several seconds despite the imposition of such transients upon its source. However, upon shutdown it is necessary to bleed off the voltage of C8 in order to reset the programmable unijunction timers.

This bleed-off is achieved by activation of transistor Q8 in the following manner. As noted above, when the user shuts down the engine by a signal instead of allowing completion of the full twelve minute starting operation, transistors Q11 and Q5 are turned off, thereby removing the potential from diode D8 and thus from the cathode of diode D12, all in a few nanoseconds from the timer relay K2 is closed by the receiver signal. However, for at least a few additional milliseconds, the contacts of relay K1 will remain closed, providing power to the STARTING B+ line. Thus, potential is available to the base of transistor Q15 through resistor R49. Since there is no longer a positive potential applied at the cathode of D12, a grounding path may be established from the base of PNP transistor Q15 through resistor R50, zener Z2, diode D12 and resistor R30. Accordingly, the potential applied through resistor R50 quickly breaks down zener Z2, causing it to conduct and thus establishing a ground path from the base of transistor Q15, turning on that transistor. The activation of transistor Q15 then provides a potential through its emitter-collector circuit to the base of NPN transistor Q8, turning on that transistor and establishing a grounding path through its emitter-collector circuit. A resistor R21 is connected between the cathode of diode D11 and the collector of transistor Q8, such that the aforementioned activation of transistor Q8 grounds resistor R21, bleeding off any residual potential in capacitor C8. The previously described deactivation of transistor Q11 and Q5 and the discharge of capacitor C8 thus removes all reference voltages from the programmable unijunction timers, resetting them to the beginning of their respective timing cycles.

As additional protective devices this remote starting system is provided with apparatus to shut down the engine and disable the system upon the occurrence of any one of a number of preselected events. For example, if the starter motor cranks the engine for a predetermined period of time without the engine starting, it is desirable to have the starting system cease cranking in order to avoid excessive discharge of the battery and possible damage to the starter motor. Accordingly, apparatus is provided in this system to deactivate the starting operation if cranking continues for more than a predetermined period, for example, ten seconds. This protective apparatus is associated with programmable unijunction transistor timer U4 in the circuit. It may be seen that the anode of unijunction U4 is connected, through resistor R45, to the cathode of diode D22, thus providing potential from the STARTING B+ line to the anode of unijunction U4 at any time that START SOL is energized. Capacitor C4 is connected between the anode of unijunction U4 and ground, the charging thereof through resistor R45 providing for the desired delay of, suitably, ten seconds from the energization of START SOL until the activation of unijunction U4. After that delay, unijunction U4 is activated, thereby providing a potential across resistor R51 to the base of transistor Q8, turning on transistor Q8 and shutting down the system in a manner as described with respect to unijunction U3 above. Accordingly, when START SOL has been activated, causing the starter motor to crank for the preselected period of time, timer U4 shuts off the entire system to prevent excessively prolonged cranking of the engine. Resistor R44 is connected between resistor R45 and ground to drain capacitor C4, and thus reset the timing of unijunction U4 at any time that the potential to capacitor C4 is cut off prior to the full timing out of unijunction U4.

In a manner exactly analogous to that described immediately above, prolonged activation, for more than ten seconds continuous duration, of GAS SOL also will effect a shutdown of the system. This protective arrangement is provided to prevent prolonged racing of the engine should transistor Q14 short out and provide long duration activation to GAS SOL. As previously described, activation of transistor Q14 applies potential through diode D21 to activate GAS SOL. This potential is also applied through diode D23 to resistor R45, capacitor C4 and unijunction U4, thus providing for the same ten second timing out of U4 as caused by prolonged activation of START SOL. Therefore, as with START SOL, continuous activation of GAS SOL for a period in excess of ten seconds will effect shutdown of the system through timer U4 and transistor Q8.

Provision also is made for shutting down the system immediately upon any tampering with the vehicle, such as by the depression of the brake pedal or the opening of the door of the vehicle. The connectors labelled BRAKE and POS DOOR may be connected to the brake light switch and the interior dome light of the vehicle respectively, thus providing sources of positive potential when activated, as by applying the brake, or by opening the door of a vehicle having a positive ground. This potential is then applied through either diode D26 or diode D27 to resistor R46 and then to capacitor C4 and unijunction U4, the value of resistor R46 being chosen to effect activation of U4 immediately and without the delay associated with resistor R45. Accordingly, in a manner analogous to that described immediately above with respect to excessively long cranking by the starter motor, the application of this potential by either depression of the brake pedal or the opening of the door immediately shuts down the engine and deactivates the starting system. Diode D25 provides for draining, through resistor R44, of any charge remaining in capacitor C4 after unijunction U4 has been activated through resistor R46. It may also be desired to shut down and deactivate the system in response to the opening of the door of a vehicle having a negative ground, as is the case in most vehicles. In this case, the connector to a normally open grounding switch, such as is associated with the interior dome light, is denoted on the diagram as NEG DOOR and is connected through diode D9 to a connection between resistors R18 and R19. When this switch is closed, as by opening a door on the vehicle, the grounding of resistor R18 deactivates transistors Q5 and Q11 and completely deactivates the system and shuts down the engine.

Since it is assumed that this remote starting system will frequently be used in a vehicle such as an automobile having a manually operated key switch for manually energizing the ignition system and operating the starter motor, additional protective apparatus is incorporated to disable the energizing circuitry of the starting system at any time such manually operated switch is activated prior to the activation of the remote starting system. When the engine is to be started through the manually operated switch K3, without prior activation of the remote starting system, the battery B+ potential will be applied to the STARTING B+ line through switch K3, without the closing of relay K1 or the prior energizing of the latching circuit Q11-Q5. Since the base of PNP transistor Q15 is connected through resistor R49 to the STARTING B+ line, this application of potential to STARTING B+ through manually operated switch K3 applies a potential to the base of transistor Q15. The base of transistor Q15 is also connected through resistor R50, zener diode Z2, diode D12 and resistor R30 to ground. Since transistors Q11 and Q5 have not been activated in this case, there is no potential at the cathode of diode D8 to prevent the grounding of resistor R50 through zener Z2, diode D12 and resistor R30, unlike the previously described situation in which the remote starting system is activated first. Accordingly, when switch K3 is closed, zener Z2 breaks down, and an appropriate bias is applied to the base of transistor Q15, turning on that transistor and providing a biasing path through its emitter-collector circuit from STARTING B+ to resistor R52 and thence to the base of NPN transistor Q8, turning on transistor Q8. Since the activation of transistor Q8 provides an alternative grounding path independent of the presence or absence of any potential at the cathode of diode D8, transistors Q15 and Q8 comprise an additional latching circuit, maintaining one another in the activated condition until affirmatively turned off. It may be noted that another transient and noise suppressing capacitor C7 is installed, with polarity reversed, across the emitter and base of transistor Q15, in a manner and for reasons similar to those discussed above with respect to transistor Q11. By virtue of the latching circuit, transistors Q15 and Q8 remain activated as long as switch K3 is closed. As described above, the energizing circuit remains disabled at any time Q8 is activated. Accordingly, the remote starting system remains disabled as long as manually operated switch K3 is closed.

When the starting system is activated first, it is prevented from disabling itself in the above-described manner, upon the energization of relay K1 by virtue of the brief delay between the activation of the latching circuit Q11–Q5 and the closing of the relay K1 contacts. Since solid state devices such as the transistors Q11 and Q5 switch on with very little delay, on the order of nanoseconds, and since a relay such as K1 closes much more slowly, on the order of 15 milliseconds, activation of this starting system by a control signal from the receiver energizes the latching circuit Q11–Q5 and provides a positive potential at the cathode of diode D8, which is connected to the cathode of transistor Q11 and to diode D12, well before potential is applied to the STARTING B+ line. Thus, the presence of B+ potential at the cathode of diode D8 prevents the creation of a grounding path for the base of transistor Q15 through resistor R50, zener Z2 and diode D12. Accordingly, when the starting system is activated remotely, without manual switch K3 being closed, transistor Q15 is not activated and does not, itself, activated transistor Q8 to disable the starting system.

To avoid overspeeding the engine once it has started, provision is made in the system for disabling the user-controlled, selective momentary fuel pumping apparatus after the engine has started. This is achieved generally by grounding the collector of Q10 through R3 and transistor Q9. As previously described, once the engine is started and running, the alternator output causes zener Z1 to break down and to conduct the alternator output through diode D4. Since resistor R1 is connected between the cathode of diode D4 and the base of NPN transistor Q9, with resistor R2 connecting the base of Q9 to ground, the alternator output also serves to turn on transistor Q9. The emitter of Q9 is connected to ground, with the collector connected to R3 and thence to the collector of transistor Q10. Accordingly, activation of transistor Q9 effectively grounds the collector of Q10 through resistor R3, the sole source of the user-controlled fuel pumping signal, thus preventing activation of Q7. As described above, activation of transistor Q7 is the means by which the user commands selective momentary operation of GAS SOL. Accordingly, the activation of transistor Q9 by the output of the alternator prevents subsequent selective, user-controlled momentary pumping of fuel into the engine by operation of the control signal transmitter. As previously noted, stalling of the engine after starting removes the alternator output, thus turning off transistor Q9 and removing its grounding of the base of transistor Q7. Accordingly, upon such stalling, the user may again remotely command momentary pumping of fuel into the engine prior to its restart.

An additional protective device is provided to prevent improper activation of the momentary pumping apparatus by the starting system when the engine is being operated under the control of the manually operated switch K3. As previously described, starting of the engine by means of switch K3 effects a latch between transistors Q8 and Q15, locking out the starting operation of the system. This latch establishes a grounding path from resistor R50 through diode D15 and transistor Q8. In addition to resistor R50, resistor R48 is also connected to the anode of diode D15, with its opposite contact connected to the base of transistor Q13. Resistor R47 connects the base of Q13 to STARTING B+ line. Accordingly, activation of transistor Q8, as by the latching of transistors Q15 and Q8, biases the base of transistor Q13, turning it on. Since the emitter of transistor Q13 is connected to STARTING B+ line, and the collector is connected to the base of transistor Q14, activation of transistor Q13 provides the positive potential of STARTING B+ to the base transistor Q14, thus reverse-biasing transistor Q14 and preventing it from turning on regardless of any grounding path established through resistor R42. Accordingly, at any time that transistor Q15 has been activated, by the application of potential to the STARTING B+ line prior to energization of the starting system through transistors Q11 and Q5, GAS SOL is disabled, thereby preventing improper system activation of the momentary fuel pumping device.

The foregoing starting system has been described principally in respect to its application to a spark ignition engine, such as may be used in an automobile. However, the system is equally applicable for use with numerous other types of combustion engines, including diesel engines. If used in conjunction with a diesel engine having a glow plug to assist in starting, it is desirable to preheat the glow plug for a substantial period of time prior to the initiation of the starting operation. A suitable modification to optimize this system for application to a diesel engine might include the connection of a relay controlling the glow plug to the IGNITION plug connection associated with relay K1, so that the glow plug will begin heating as soon as relay K1 is closed. Additionally, it may be desirable to increase the delay associated with timer U1 to provide for substantially longer preheating of the glow prior to initiation of the starting operation. The starting system of this invention provides for such adjustment of the timer U1 delay by a simple modification of the previously described R-C circuit comprising capacitor C1 and resistors R31, R32 and R33. The values of these components are selected such that utilization of both R31 and R32 together provides a brief delay, such as five seconds, while the elimination of the resistor R32 path from MAIN B+ provides a substantially longer delay, such as two minutes. Thus, removal of the R32 path, such as by simply clipping the leads of the resistor, provides for a longer delay to enable the flow plug to preheat before activating the starting operation.

To adapt the starting system to certain engines in which the alternator output is not suiable for signaling the starting of the engine as described above, an alternative start sensing device may be employed. Such a suitable alternative may be a pressure switch connected to B+ and located in the intake manifold of the engine, which switch closes in response to a predetermined level of manifold pressure associated with the starting of the engine, thus providing potential through the vacuum switch to diode D4. The remaining portions of the starting system remain as described above.

Numerous other additional features, such as disclosed in the aforementioned U.S. Pat. Nos. 3,478,730, 3,685,606 and 3,793,529 may suitably be incorporated into this system to provide additional functions and benefits. Accordingly, the scope of the invention is not to be limited by the foregoing detailed description of a preferred embodiment but is to be defined solely by the claims appended hereto.

I claim:

1. A system to enable a user to start, from a remote location, a combustion engine having an electric starter motor and a source of electrical potential associated therewith, said system comprising:

a receiver for receiving a control signal selectively generated by said user;

means coupled to said receiver and responsive to selective, repetitive receptions of said control signal for selective, repetitive, user-controlled pumping of fuel into said engine prior to activation of a starting operation; [and]

means also coupled to said receiver and responsive to the last of said receptions of said control signal for activating said starting operation and connecting said potential source to said starter motor*; and*

*means for preventing any said selective pumping by said user after said starting operation has been activated until said starting operation has been terminated.*

2. A system according to claim 1 further comprising means for activating desired auto accessories concurrently with said pumping.

[3. A system according to claim 1 further comprising means for preventing any said selective pumping by said user after said starting operation has been activated until said starting operation has been terminated.]

4. A system according to claim 1 further comprising means for maintaining the throttle of said engine substantially open during said starting operation until said engine has been started and then closing said throttle to an idling position, whereby additional fuel may be provided to said engine during the initial portion of the starting operation which avoiding overspeeding the engine once started.

5. A system according to claim 1 further comprising means for automatically effecting momentary pumping of fuel into said engine at a plurality of predetermined intervals during said starting operation.

[6. A system according to claim 1 further comprising means for preventing any said pumping of fuel into said engine, by user operation of said system, while said engine is running.]

7. A system according to claim 1 wherein a manually operated switch is interposed between said source of electrical potential and said starter motor, and further comprising means for disabling said starting operation activating means when said manually operated switch is activated.

8. A system according to claim 7 further comprising protective means for preventing activation, by any signal within said system, of any momentary fuel pumping means while said disabling means is activated.

9. A system according to claim 1 further comprising protective means for preventing activation of said starting operation by externally generated electrical transients and noise, said protective means comprising a capacitor connected, with its polarity reversed, between the emitter and base of a transistor in said starting operation activating means with a resistor connected across said capacitor.

10. A system according to claim 1 further comprising means to stop said engine upon receipt of said control signal from said user at said remote location.

11. A system according to claim 1 further comprising means for de-energizing said starting operation activating means and disconnecting said potential source from said starter motor if the engine does not start within a predetermined time after said potential source is connected to said starter motor by said starting operation activating means.

12. A system according to claim 1 further comprising means for de-energizing said starting operation activating means and stopping the engine after the engine has been started and has run in accordance with said starting operation for a predetermined period of time.

13. A system according to claim 1 further comprising means to detect starting of said engine and to disconnect said potential source from said starter motor upon said starting, and to detect subsequent stalling of said engine during said starting operation and to reconnect said potential source to said starter motor subsequent to said stalling.

* * * * *